US012297082B2

(12) United States Patent
Girotto et al.

(10) Patent No.: US 12,297,082 B2
(45) Date of Patent: May 13, 2025

(54) TRANSPORT SYSTEM FOR AN ELEVATOR OR LIFT

(71) Applicant: IRONBOX S.R.L., Spresiano (IT)

(72) Inventors: Adriano Girotto, Spresiano (IT); Luca Cesaretti, Spresiano (IT); Lorenzo Andrea Parrotta, Spresiano (IT)

(73) Assignee: IRONBOX S.R.L., Spresiano (IT)

( * ) Notice: Subject to any disclaimer, the term of this patent is extended or adjusted under 35 U.S.C. 154(b) by 0 days.

(21) Appl. No.: 18/278,673

(22) PCT Filed: Feb. 20, 2022

(86) PCT No.: PCT/IB2022/051499
§ 371 (c)(1),
(2) Date: Aug. 24, 2023

(87) PCT Pub. No.: WO2022/180499
PCT Pub. Date: Sep. 1, 2022

(65) Prior Publication Data
US 2024/0124267 A1 Apr. 18, 2024

(30) Foreign Application Priority Data
Feb. 26, 2021 (IT) ........................ 102021000004625

(51) Int. Cl.
*B66B 7/04* (2006.01)

(52) U.S. Cl.
CPC .............. *B66B 7/044* (2013.01); *B66B 7/047* (2013.01)

(58) Field of Classification Search
CPC ................................ B66B 7/044; B66B 7/047
See application file for complete search history.

(56) References Cited

U.S. PATENT DOCUMENTS 5,020,639 A * 6/1991 Michel ................ B66B 11/0293 187/400
5,531,294 A * 7/1996 Burton ...................... B66B 1/28 187/292
6,357,554 B1 * 3/2002 Valk ...................... B66B 1/3484 187/292
(Continued)

FOREIGN PATENT DOCUMENTS

GB 2262932 A 7/1993
JP 2005298073 A 10/2005
(Continued)

*Primary Examiner* — Michael A Riegelman
(74) *Attorney, Agent, or Firm* — Rivka Friedman

(57) ABSTRACT

A translation and/or transportation system, such as an elevator, is described comprising a movable structure for transportation, e.g. a passenger cabin or a load-carrying platform, a guide and a skid integral with the movable structure and slidingly coupled to the guide along a sliding axis.
The skid is configured to stably and slidingly couple the movable structure to the guide, and comprises a centering member in contact with the guide.
To attenuate the sliding friction, the skid comprises means—or a device—for generating without contact with the guide a force counteracting an external load impressed on the centering member, the load-counteracting force being repulsive or attractive on the guide, and directed in the opposite direction to the force impressed by the external load on the centering member.

20 Claims, 8 Drawing Sheets

(56) References Cited

U.S. PATENT DOCUMENTS 7,014,013 B2 * 3/2006 Fujita ...................... B66B 7/044 187/292
7,374,021 B2 * 5/2008 Marti ...................... B66B 7/046 187/370
10,266,374 B2 * 4/2019 Löser .................... B60P 1/4421
10,501,287 B2 * 12/2019 Zimmerli ................ B66B 7/044
11,167,647 B2 * 11/2021 Girotto .................. B60L 13/04
11,428,263 B2 * 8/2022 Girotto ................. F16C 32/041
11,927,041 B2 * 3/2024 Girotto .................. E05D 15/06
2002/0179377 A1 * 12/2002 Higaki .................... B66B 7/044 187/292
2003/0192745 A1 * 10/2003 Utsunomiya ........... B66B 7/042 187/292
2004/0129503 A1 * 7/2004 Kunz ........................ B66B 7/02 187/391
2005/0241886 A1 * 11/2005 Marti ...................... B66B 7/046 187/351
2005/0279588 A1 * 12/2005 Fujita ...................... B66B 7/048 187/393
2007/0199770 A1 * 8/2007 Kocher ............... B66B 11/0407 187/277
2009/0308697 A1 * 12/2009 Boschin ................ B66B 5/0018 187/409
2012/0004777 A1 * 1/2012 Wang ...................... F16F 9/535 700/286
2012/0043167 A1 * 2/2012 Yokobayashi ........ B66B 7/1292 187/409
2013/0220738 A1 * 8/2013 Kalliomaki ............. B66B 11/02 187/401
2013/0304262 A1 * 11/2013 Wang .................. G05B 13/041 700/280
2014/0246274 A1 * 9/2014 Ach .................... B66B 11/0206 187/251
2015/0128403 A1 * 5/2015 Valkama ............... B66B 19/002 29/281.6
2016/0068369 A1 * 3/2016 Valkama ............... B66B 5/0087 33/645
2016/0137458 A1 * 5/2016 Godwin .................... B66B 9/00 187/250
2016/0272465 A1 * 9/2016 Nakano ..................... B66B 1/30
2017/0305719 A1 * 10/2017 Jetter .................... B66B 11/026
2017/0327346 A1 * 11/2017 Löser ...................... B66B 7/046
2017/0355563 A1 * 12/2017 Zimmerli ................ B66B 17/34
2019/0143840 A1 * 5/2019 Girotto .................. B60L 13/04 104/281
2019/0352128 A1 * 11/2019 Korhonen ............... B66B 7/047
2020/0362913 A1 * 11/2020 Girotto ................. F16C 32/041
2021/0197658 A1 * 7/2021 Girotto .................. H02K 16/02
2021/0332626 A1 * 10/2021 Girotto ................. E05D 15/063
2022/0381075 A1 * 12/2022 Girotto ................. E05F 15/632
2024/0124267 A1 * 4/2024 Girotto .................. B66B 7/047
2024/0199377 A1 * 6/2024 Lee ..................... H01L 21/6773

FOREIGN PATENT DOCUMENTS

WO 200514459 A2 2/2005
WO 2017216656 A1 12/2017

* cited by examiner

TRANSPORT SYSTEM FOR AN ELEVATOR OR LIFT

TECHNICAL FIELD

The invention relates primarily to a skid for a vertical or inclined translation transportation system for a load, such as an elevator or freight elevator, and to the system comprising the skid. The skid is configured to slidingly guide and move, e.g. linearly, a movable structure carrying a load along an axis, and preferably is magnetically levitated.

BACKGROUND

It is known to exploit magnets in sliding skids for elevator cabins, see e.g. CN103332552A1, taken here as an example.

FIG. 1 herein shows the general architecture of the elevator. The cabin 12 can be moved on vertical and parallel guides 14 along an axis Y by coupling to the guides 14 via skids 10, which are integral with the cabin 12. The movement of the cabin 12 is made, for example, by a known system of pulling ropes and counterweights.

A problem, felt especially in the so-called "chair" elevators (FIG. 2), those in which the guides 14 are not in the middle of the cabin 12 to allow access to the cabin 12 from three sides, is that the weight of the cabin 12 and/or the variable load (the number of passengers) generates a moment M that would tend to tilt the cabin 12 on the guides 14 pressing the skids 10 on the guides 14. The moment M then causes an increase in friction in the skids 10, worsening their performance. In general, this problem occurs in any case where the center of gravity of the load is not aligned with respect to the guides.

Another problem with the system in FIG. 1 is the centering, i.e. the cabin 12 must be kept centered between the guides 14. For a single guide, the problem is generally to keep the skid on the guide, e.g. avoiding detachment.

SUMMARY

A first aspect of the invention relates to a translation and/or transportation system of a load, such as an elevator, comprising:

- a movable structure to move the load, such as a passenger cabin or a load-carrying platform,
- a, e.g. vertical or inclined, guide
- a skid integral to the movable structure and slidingly coupled to the guide, wherein the skid is configured to stably and slidingly couple the movable structure to the guide.

The system may comprise a single guide, e.g. located at the center of the movable structure, or two spaced parallel guides, which may be vertical or inclined with respect to the horizon.

The movable structure is for example an elevator passenger cabin or a loading platform for goods; the skid may also be applied for guiding the counterweight of an elevator.

The skid comprises a centering member in contact with the guide, in particular in simultaneous contact with the two opposite sides of the guide. The centering member is, for example, sliding and/or rolling on the guide (by means of wheels and/or sliding parts) and serves to center the skid on the guide. The centering member is subjected to the/an external load and thus causes friction with the guide.

In order to solve the problem of friction on the centering member, one or each skid comprises means—or a device—for generating without contact with the guide a load-counteracting force on the centering member (see e.g. FIG. 2). This load-counteracting force is repulsive or attractive on the respective guide, and directed in the opposite direction to the force imposed by the external load on the centering member.

The load-counteracting force acts on the centering member in the opposite direction to the load, so that the final frictional force is lower because the contact force on the centering member is determined by the algebraic sum of the force imposed by the load and the load-counteracting force.

In other words, the load-counteracting force acts in the opposite direction to the load on the centering member and/or opposes such load by reducing it: the load reduction results in less friction on the centering member and in better dynamic performance of the skid along the sliding axis Y. With two guides, the load-counteracting force is adapted to generate a moment on the movable structure tending to make it rotate about an axis parallel to the plane containing the guides in the opposite direction to that determined by the moment M in FIG. 2. This way the load-counteracting force can compensate or counteract the moment M due to the load by unburdening the skids from the external load.

The load-counteracting force is preferably directed along

- a direction parallel to a plane orthogonal to the longitudinal axis of the guide and/or
- a direction orthogonal to the plane containing the guides (if there are two).

The skid or centering member itself can have different topologies. E.g. a very simple topology envisages only sliding casters, or a low friction sliding surface, or a pneumatic levitation skid.

A preferred topology for the skid envisages that it is magnetically levitated and is configured for magnetically generating a coupling, repulsive or attractive, force on the guide adapted to stably and slidingly couple the movable structure to the guide, e.g. to prevent the detachment of the skid from the guide and/or the squeezing of the skid on the guide.

In the case of two parallel vertical guides, to solve the problem of centering between the guides the system may comprise

- two magnetic levitation skids integral with the movable structure and respectively slidingly coupled to one of the guides,
- wherein one or each skid is configured for magnetically generating the coupling, so repulsive or attractive, force on the respective guide, which force is
  - equal and opposite to that generated by the other skid, and
  - directed along a direction joining the two skids,
- the coupling forces generated by the skids being adapted to center the movable structure with respect to the guides making it stay at a median point between the guides.

Although it may be sufficient for only one skid to develop the coupling force on the guide, it is preferred that each skid pushes and/or attracts the respective guide, and the composition of the aligned coupling forces generated by the skids determines the centering of the structure between the guides.

Preferably, the coupling forces generated by the skids determine for the position of the movable structure between the guides a stable equilibrium condition, thanks to the fact that a deviation from such position causes the coupling force of one or each skid to vary so as to return the movable structure to the unperturbed position.

For inclined transport systems, the perpendicular forces may compensate for the tilting moment and also for a normal component of the load due to the weight of the movable structure. If this is not the case, preferably the system comprises four skids, two upper and two lower skids, two by two aligned on a respective guide. In this case, the two upper skids will generate a load-counteracting force of opposite direction to that generated by the lower skids.

Relatively to the preceding technical solutions for one or each of the above two problems, the actual configuration of the skid is not essential, however a preferred construction of the magnetic levitation skid may bring other functional and structural advantages. In a preferred construction one or each of the skids comprises:

- a body made of ferromagnetic material, provided with a linear cavity which extends parallel to a sliding axis of the skid and which is mountable astride the guide,
- a magnetic flux generator for generating a magnetic flux that closes in the body and strikes the sides of the guide by exiting and entering—respectively—opposite walls of the cavity.

The guide in turn comprises a magnetic field reactive portion (e.g. made of a ferromagnetic material) that, for example, protrudes cantilevered from a base. The reactive portion is slidably mounted in the linear cavity (or hollow channel) for sliding relatively to the cavity parallel to the sliding axis as the skid moves relative to the guide.

In particular, said reactive portion has a cross-section which, viewed in a plane orthogonal to the sliding axis, has a mushroom shape (a larger dimension or width in the part struck by the magnetic field exiting or entering the opposite walls of the cavity, i.e. the part farthest from the base, and a smaller dimension or width in the part closest to the base). In this way the coupling force generated by the magnetic field on the reactive portion is such that the force increases when the reactive portion tends to move away, orthogonally to the longitudinal axis, from a stable point inside the cavity to exit therefrom or enter thereinto more. The coupling force is then directed along a direction parallel to the walls of the U or C, and directed toward the bottom of the cavity.

To minimize leakage, the flux generator is preferably mounted within a magnetic circuit configured to convey the magnetic flux so that the flux crosses the linear cavity. Even more preferably, the generator is mounted in a magnetic circuit configured to define said linear cavity, in particular it is mounted in the body made of ferromagnetic material.

Preferably, the body made of ferromagnetic material is a body having a substantially constant U or C-shaped cross-section along the sliding axis. The linear cavity is then defined by the concavity of the U or C, and the opposite walls of the cavity are constituted of the inner walls of the parallel legs of the U or C.

In particular, the load-counteracting force is directed along a direction (i.e. geometrically incident only at one point) external to a (imaginary) plane that divides the linear cavity in half and passes through the longitudinal axis of the guide or cavity. This preferential direction for vertical guides makes the load-counteracting force substantially orthogonal to the centering force between the two guides developed by two opposite skids. Inclinations of less than 90° between the load-counteracting force and said imaginary plane are also possible.

In particular, the load-counteracting force has a direction substantially perpendicular to the parallel inner surfaces of the U or C, or a direction substantially perpendicular to the opposite parallel inner surfaces of the linear cavity formed by said body.

In particular, the load-counteracting force has a direction substantially perpendicular to the direction of the coupling force that develops between the parallel walls of the U or C. This coupling force is substantially parallel to the parallel walls of the U or C and acts to keep the guide within the cavity of the U or C.

The means or device for generating the load-counteracting force may have various advantageous embodiments, which may be implemented alone or in combination.

In a variant, the means or device for generating the load-counteracting force are configured for generating the load-counteracting force pneumatically. E.g. said means comprise a pressurized fluid (e.g. air) generator that is conveyed against the guide to press against it with a force directed in a direction orthogonal to the plane containing the guides (if there are two). Or the pressurized fluid generator sucks fluid to attract the guide by depression and exert an attractive force on the guide directed in a direction orthogonal to the plane containing the guides (if there are two).

In a variant, the means or device for generating the load-counteracting force are configured for generating the load-counteracting force electrostatically, i.e. through the attractive or repulsive force of electric charges. E.g. said means comprise an electrostatically charged surface for pushing or attracting the guide via an electrostatic force.

In a more preferred variant, the means or device for generating the load-counteracting force are configured for generating the load-counteracting force magnetically, i.e. due to an attractive or repulsive force generated via a magnetic field.

The load-counteracting force generated by magnetic means may be generated in several ways.

In a preferred variant, the skid comprises means or a device for displacing, relative to the guide, a portion of the magnetic circuit containing the flux generator so that the displacement unbalances the magnetic forces in the linear channel exerted on the sides of the reactive portion of the guide. Then, a side of the reactive portion is attracted by the magnetic field present in the cavity with greater force. This greater lateral force constitutes the load-counteracting force and alleviates the lateral load on the skid and the centering member.

In particular, the skid comprises means or a device for displacing relatively and orthogonally to the sliding axis of the skid a portion of the magnetic circuit containing the flux generator, e.g. a portion of ferromagnetic material, or the flux generator itself, relative to said reactive portion of the guide. The displacement unbalances the magnetic forces in the linear channel exerted on the sides of the reactive portion of the guide, so that the side of the reactive portion closest to the inner walls of the cavity is attracted by the magnetic field present in the channel with greater force. This greater lateral force constitutes the load-counteracting force and alleviates the lateral load on the centering member.

In a more preferred variant, the skid comprises means or a device for relatively displacing said body made of ferromagnetic material, or the flux generator, or said portion of magnetic circuit, relative to said reactive portion of the guide orthogonally to the sliding axis of the skid. The displacement unbalances the forces exerted by the walls of the U or C of said body on the sides of the reactive portion of the guide, so that the side of the reactive portion closest to the inner walls of the U or C is attracted by the magnetic field present in the channel of the U or C with greater force. This greater lateral force constitutes the load-counteracting force and alleviates the lateral load on the centering member.

E.g. the skid may comprise a pressing body, e.g. a wheel or button, for contacting the guide and relatively displacing the reactive portion of the guide relative to said body. Thus, by adjusting the position of the pressing body, which e.g. is integral with a base or a support plate for said body, the relative position between said body and the reactive portion orthogonal to the sliding axis of the skid can be adjusted, and thus the amplitude of the load-counteracting force. In an even more preferred variant, the pressing body is mounted on the centering member.

In an even more preferred variant, the skid comprises an adjustment member for setting, for example manually, the position of the pressing member.

In a different more preferred variant, the means or a device for generating the load-counteracting force comprises an auxiliary magnetic field generator mounted in the skid to attract or repel the guide with a force directed in a direction parallel to a plane orthogonal to the longitudinal axis of the guide, or in a direction orthogonal to the plane containing the guides (if there are two), or in a direction orthogonal to the parallel walls of the U or C.

In an even more preferred variant, the auxiliary magnetic field generator is movably mounted in the skid to be able to move relative to the guide coupled to that skid, e.g. to be able to move orthogonally to the sliding axis of the skid, or to be able to move in a direction orthogonal to the parallel walls of the U or C, so that the amplitude of the load-counteracting force can be adjusted.

For compactness, preferably the auxiliary magnetic field generator is movably mounted on or in the body made of ferromagnetic material.

In an even more preferred variant, the skid comprises an adjustment member for determining the relative distance between the guide coupled to that skid and the auxiliary magnetic field generator, thereby determining the amplitude of the load-counteracting force.

The adjustment member may have advantageous variants.

In a first simple variant, the adjusting member is coupled between the skid and the means for generating the load-counteracting force, the adjusting member being adapted to push or pull the means for generating the load-counteracting force. E.g. the adjustment member is a screw, screwed into the skid and the means for generating the load-counteracting force by means of a corresponding thread.

In a second variant, the adjustment member is an articulated parallelogram structure formed by

- a side that consists of the means for generating the load-counteracting force,
- an opposite side that consists of a fixed portion of the skid, e.g. of said body, and
- two rigid arms connecting said sides so as to be able to translate the means for generating the load-counteracting force relatively to—and e.g. orthogonally to—the guide.

Preferably, the skid comprises a base or support plate, and the body made of ferromagnetic material is mounted oscillating with respect to the base or support plate about an axis passing through the centerline of the body made of ferromagnetic material, said axis passing through the centerline being

- parallel to a plane containing the guides, or contained in a plane orthogonal to the sliding axis of the skid;
- so that the body made of ferromagnetic material can oscillate about the axis passing through the centerline, a feature that allows the skid to adapt dynamically to small irregularities of the guide.

In a variant, the body made of ferromagnetic material is hinged, about said axis passing through the centerline, either to the base or the support plate or, more preferably, to a housing member containing the body made of ferromagnetic material. The housing member preferably is in turn mounted oscillating with respect to the base or the support plate about said axis passing through the centerline.

It is advantageous to be able to measure the force exerted on the centering member by the guide, i.e. the load that causes friction on the skid. This can be used, for example, for safety checks, maintenance, or to check the efficiency of the means for generating the load-counteracting force, or to best manually adjust, during installation, the force generated by the means for generating the load-counteracting force.

It is particularly advantageous to measure the force imparted to the centering member and then act on said adjustment member, and/or directly on the means of generating the load-counteracting force, in order to vary the amplitude of the load-counteracting force as a function of the measured force imparted to the centering member. This makes it possible, for example, to automatically feedback control the load-counteracting force in order to reduce to zero or to a minimum the force imparted on the centering member and thus the friction such force causes.

Preferably then in the skid the body made of ferromagnetic material is mounted hinged with respect to the base or the support plate about an axis passing through an end of the body made of ferromagnetic material,

- said axis passing through the end being
  - parallel to a plane containing the guides, or contained in a plane orthogonal to the sliding axis of the skid;
  - so that the body made of ferromagnetic material is hinged about the axis passing through the end, a feature that allows the body made of ferromagnetic material to maintain a degree of freedom with respect to the longitudinal axis of the guide.

In particular, the body made of ferromagnetic material is mounted hinged on the housing member. Note that the provision in the skid of the housing member allows the two aforementioned passing axes to be implemented simultaneously.

Basically then, the body made of ferromagnetic material ends up unconstrained about an axis parallel to the plane containing the guides, or about an axis parallel to a plane orthogonal to the sliding axis. This feature allows detecting both the static load on the centering member and the final and actual effect of the load-counteracting force on the body made of ferromagnetic material and/or on the centering member.

In a more preferred variant, the skid comprises a sensor for measuring the force imparted by the guide on the skid orthogonally to the sliding axis, in particular for measuring the force imparted by the guide on the centering member (directly or by interposition of other parts).

The sensor may be e.g. a load cell, a strain gauge, or a pressure sensor.

In the case of the pressure sensor or load cell, to obtain the above advantages it can be installed in the skid to detect the pressure (force) between

- the body made of ferromagnetic material and the reactive portion of the guide, and/or
- the centering member of the skid and the reactive portion of the guide, and/or
- the body made of ferromagnetic material and the housing member (if any).

In a more preferred variant, the skid or the elevator or the system comprises an electronic (e.g. microprocessor-based) circuit programmed or configured (e.g. an analog electronics board) for

- detecting a signal from the sensor, and driving the means or device for generating the load-counteracting force and/or the adjustment member in order to
adjust the amplitude of the load-counteracting force so as to
bring or maintain the value emitted by said sensor to a reference value, e.g. zero or substantially zero.

The amplitude of the load-counteracting force may be controlled by an electrical signal, e.g. in the case the means for generating the load-counteracting force are an electromagnet. The regulation of the load-counteracting force occurs then by the electronic circuit via an electrical signal.

Or the amplitude of the load-counteracting force may be controllable by a mechanical displacement, i.e. the load-counteracting force on the guide depends on the relative position between the guide and the means for generating the load-counteracting force. In an even more preferred variant, the skid or elevator or system comprises an actuator for moving the means for generating the load-counteracting force and/or the adjustment member. The actuator is e.g. electric, such as a rotary or linear motor.

In an even more preferred variant, said electronic circuit is connected to the actuator to drive the actuator, and indirectly the amplitude of the load-counteracting force, via an electrical signal.

A second aspect of the invention relates to a skid, e.g. for an elevator or freight elevator, as defined above.

A third aspect of the invention relates to a first method of reducing friction between a skid mounted on a movable load-bearing structure and a guide on which the skid can slide along a sliding axis while remaining centered thereon through a centering member, wherein the externally applied force on the centering member is reduced by generating, without contact with the guide, a force counteracting such load (see, for example, the force F in FIG. 2), repulsive or attractive on the respective guide, directed in the opposite direction to the externally applied force on the centering member and in a direction
parallel to a plane orthogonal to the longitudinal axis of the guide and/or
orthogonal to the plane containing the guides (if there are two).

With two guides, the load-counteracting force acts to generate a moment on the movable structure tending to make it tilt with respect to the plane of the guides, about an axis parallel to the plane containing the guides, in the opposite direction to that determined by the moment M in FIG. 2.

A preferred step of the first method envisages generating the load-counteracting force pneumatically, or electrostatically, or magnetically (i.e. exploiting the interaction of the guide with an electromagnetic field to create the load-counteracting force).

A preferred step of the first method envisages generating the load-counteracting force magnetically by relatively displacing a portion of the magnetic circuit, and/or the flux generator, relative to said reactive portion of the guide, so as to create a net force applied by the magnetic field on the sides of the reactive portion of the guide to attract it toward an inner wall of the channel.

A more preferred step of the first method envisages generating the load-counteracting force magnetically by relatively displacing said body made of ferromagnetic material, or a portion thereof, with respect to said reactive portion of the guide orthogonally to the sliding axis of the skid, so as to create a net force within the cavity of the U or C that is applied by the magnetic field on the sides of the reactive portion of the guide to attract it to an inner surface of the U or C.

Another more preferred step of the first method envisages generating the load-counteracting force magnetically via an auxiliary magnetic field generator mounted in the skid to attract or repel the guide, particularly with a force directed in a direction orthogonal to the plane containing the guides and/or orthogonal to the inner surfaces of the U or C-shaped cavity.

In a more preferred variant, the auxiliary magnetic field generator is displaced relative to the guide coupled to that skid, e.g. orthogonally to the sliding axis of the skid, so as to adjust the amplitude of the load-counteracting force.

Another more preferred step of the first method envisages measuring with a sensor the force imparted on the centering member by the guide, i.e. the load that causes friction. In particular, in the first method, said imparted force is measured and then the amplitude of the load-counteracting force is varied, for example, by means of an electronic feedback circuit, as a function of the measured imparted force in order to zero or decrease the externally imparted force on the centering member.

A fourth aspect of the invention relates to a second method of controlling a skid as defined above, with the steps of generating within the skid a load-counteracting force on the centering member without contact, a force that is repulsive or attractive on the respective guide, and which is directed
in the opposite direction to an external load force on the centering member, and that is
parallel to a plane orthogonal to the longitudinal axis of the guide, and/or
orthogonal to the plane containing the guides (if there are two),
to decrease the force imparted by the sides of the guide on the centering member.

In this way the moment due to the load on the centering member can be compensated unburdening the skids from the load, reducing friction and improving their sliding properties.

A fifth aspect of the invention relates to a control method for a skid as defined above, with the steps of detecting a signal from a sensor to determine the force imparted by the sides of the guide (or of its reactive portion) on the centering member, or e.g. on the body made of ferromagnetic material, and
adjusting the amplitude of the load-counteracting force in order to bring or maintain the value of said imparted force to a reference value, e.g. zero or substantially zero.

In the fourth and fifth aspects the generated force can be generated as in the third aspect.

Both said generator of, or means for generating a, magnetic flux, and the auxiliary magnetic field generator, may have different embodiments, e.g. one or more electromagnets or one or more permanent magnets.

The guide is e.g. a rail, and does not necessarily have to be strictly straight.

Said load-counteracting force may also be reduced if necessary to increase the friction on the centering member and exploit the skid as a brake.

A sixth aspect of the invention then relates to a method for braking said skid mounted on said movable load-bearing structure and said guide on which the skid can slide along a sliding axis while remaining centered thereon by means of a centering member, wherein the force externally imparted on the centering member is increased by adjusting (i.e. reducing) without contact with the guide said load-counteracting force (see e.g. the force F in FIG. 2).

The method for braking shares all of the variants defined above for the other aspects of the invention.

The load-counteracting force can be set at the factory, during the first installation of the translation system or adjusted in real time during the operation of the translation system. E.g. the force developed by one or each of the skids to counteract the load may be adjusted independently of the other skids, and in particular to compensate for changes in the load of the system (e.g. think of an elevator where passengers move inside the cabin and/or the number and/or position of passengers in the cabin varies).

BRIEF DESCRIPTION OF THE DRAWINGS

The advantages of the invention will be clearer from the following description of preferred embodiments of the skid, reference being made to the attached drawing wherein.

DETAILED DESCRIPTION

In the figures equal numbers indicate equal or conceptually similar parts; the letters N and S indicate north and south magnetic poles, respectively; and the arrows enclosed within the materials indicate lines of magnetic flux.

Figure 1:
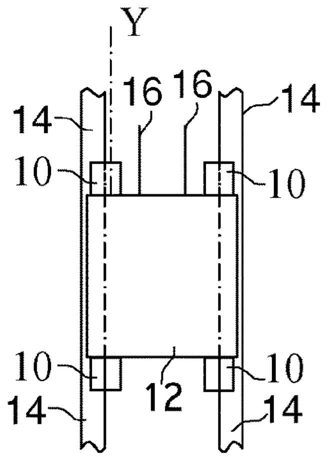
FIG. 1 shows a schematic front view of an elevator cabin.
Figure 2:
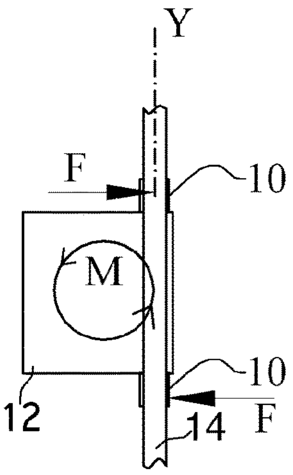
FIG. 2 shows a schematic side view of an elevator cabin.
Figure 3:
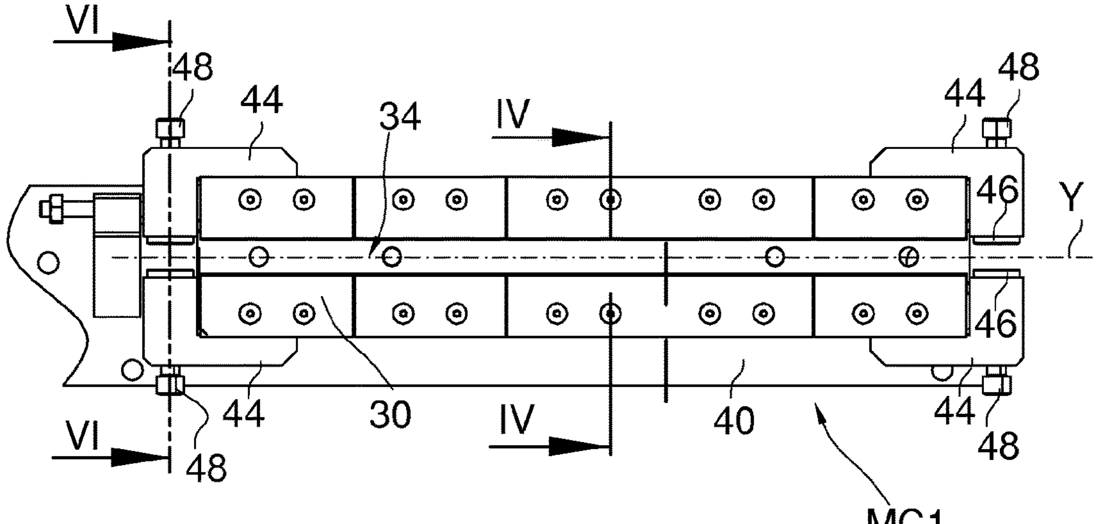
FIG. 3 shows a first variant of skid seen from above.
Figure 4:
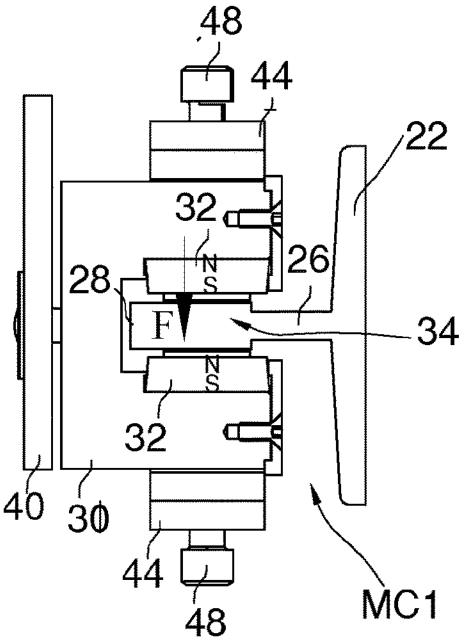
FIG. 4 shows a cross-section according to the IV-IV plane of the skid in FIG. 3.
Figure 5:
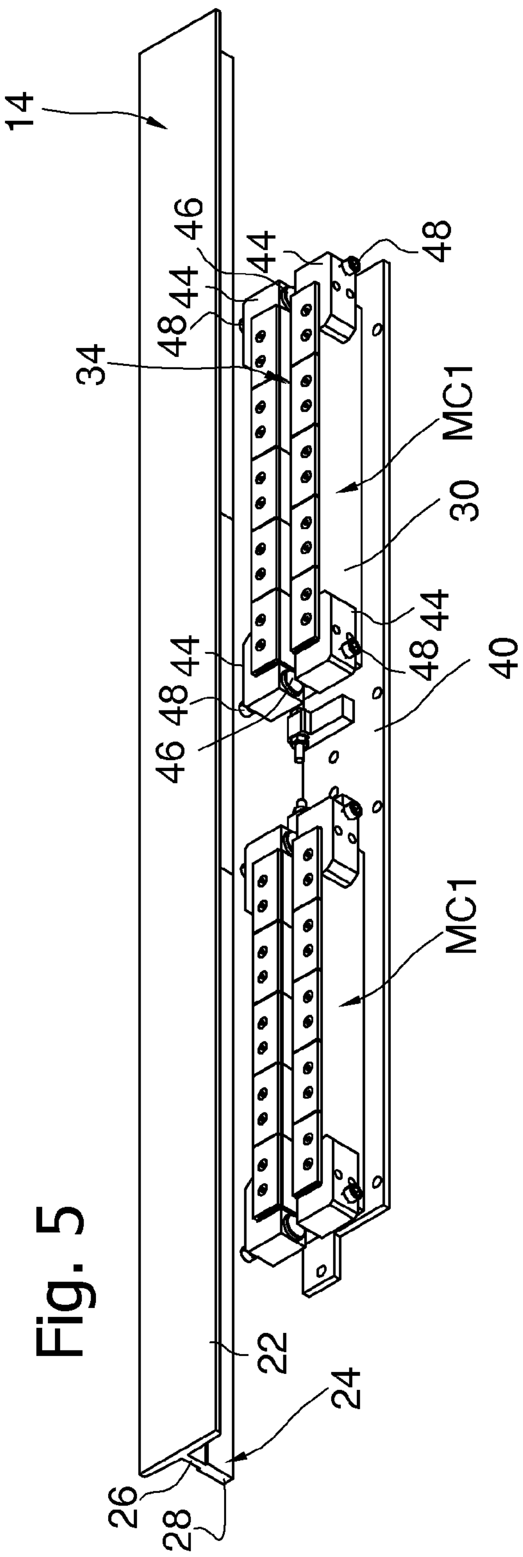
FIG. 5 shows a three-dimensional view the skid in FIG. 3.
Figure 6:
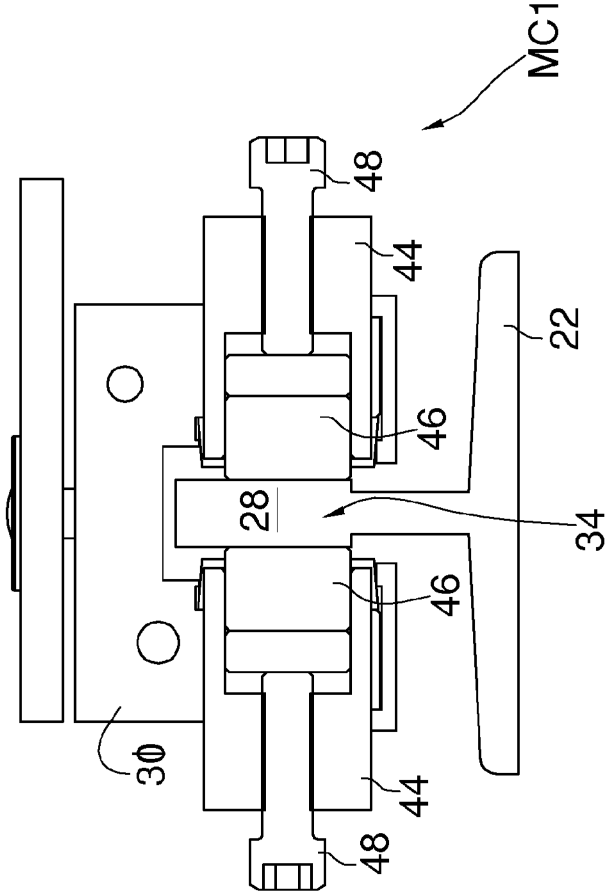
FIG. 6 shows a cross-section according to the VI-VI plane of the skid in FIG. 3.

FIG. 5 illustrates two skids MC1 sliding on a straight guide 14 along a sliding axis Y. The skids MC1 correspond to an upper skid and a lower skid in FIGS. 1 and 2. Although the system preferably comprises two pairs of skids MC1, each on a guide 14, as in FIGS. 1 and 2, for simplicity only one skid is described.

The guide 14 has a T-shaped cross-section, with a flat support base 22 and a guide portion 24 that protrudes cantilevered from the base 22. Preferably, the entire guide 20 is made of ferromagnetic material, e.g. iron, or at least the guide portion 24 is made of a material responsive to a magnetic field, e.g. made of a ferromagnetic material, e.g. iron. For example, the guide 14 may be a conventional guide used in the context of elevators.

The skid MC1 comprises a body 30 mounted on a plate 40.

The body 30 has a U-shaped cross-section, and inside it are mounted magnets 32 arranged—respectively—at the ends of the U and parallel to the Y axis. The body 30 thus defines an empty linear channel 34 crossed by all equiverse lines of magnetic field exiting from one end of the U and entering the other.

Because the portion 24 is inserted into the channel 34, the field lines strike orthogonally the surface of the sides of the portion 24.

The portion 24 preferably has a mushroom-shaped cross-section, that is, a section that, when viewed in a plane orthogonal to the Y axis, has a narrower stem 26 and a wider head 28. In other words, the section is larger at the head 28 and narrows at the stem 26 (which is the portion closest to base 22).

The discontinuity between the portions of the stem 26 and the head 28 may be abrupt, step-like, or may be gradual like a ramp. This shape ensures that a magnetic coupling force develops between the portion 24 and the skid MC1 tending to keep the skid MC1 and the guide 14 at the same relative distance orthogonally to Y. In fact, when, due to the load, the head 28 tends to misalign with respect to the ends of the U, a magnetic pullback force is developed, directed orthogonally to the axis Y, which brings the head 28 back to the center of the U.

Any positional perturbation of the head 28 entails a change in the reluctance of the magnetic circuit formed by the U and the head 28, and generates a reaction magnetic force that tends to bring the system into the lowest reluctance configuration. An equilibrium position is then reached in which the centering magnetic force of the skid balances the perturbation on the guide and/or a load tending to pull the head 28 out of the channel 34, or tending to push the head 28 into the channel 34, perpendicularly to the Y axis.

At the ends of the channel 34 are two pairs of opposing centering members 44, respectively. Each pair of centering members 44 is sized to constantly brush on the portion 28 to follow the guide 14.

On the centering members 44 the external load generates friction that opposes the sliding of the skid MC1.

The skid MC1 comprises means for generating a load-counteracting force F, repulsive or attractive on the portion 24, directed in a direction orthogonal to the plane containing the guides 14, i.e. in the example orthogonal to an imaginary plane longitudinally dividing the channel 34.

The force F is used to counteract the load on the centering members 44 in order to unburden the skids of the external load so that they can slide with less friction.

For this purpose, one or each of the members 44 is provided with a presser 46, facing the channel 34, which brushes on the head 28 and by sliding linearly (projecting more or less from the volume of the member 44) can push the head 28 laterally.

Then, by adjusting the linear position of the presser 46, the force with which they/it push/es the head 28 can be adjusted. The relative position between a presser 46 and its belonging member 44 can be fixed, for example, by means of a blocking screw 48.

Figure 14:
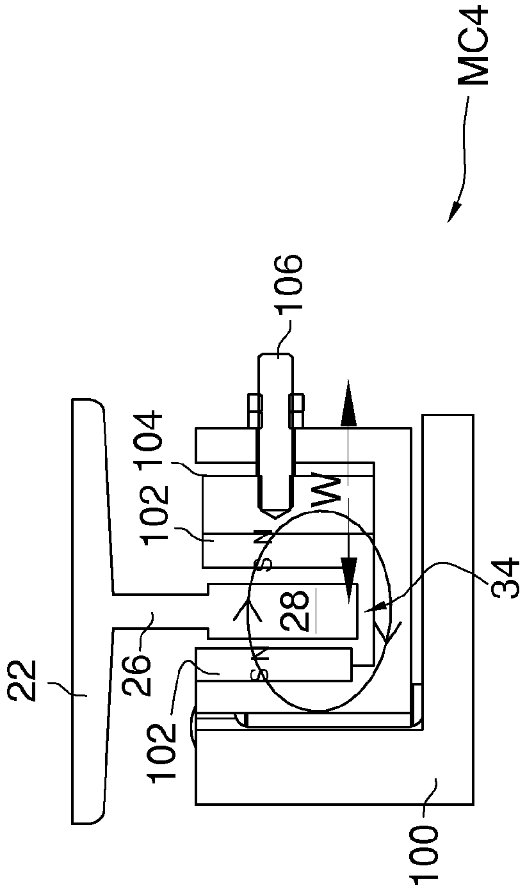
FIG. 14 shows a schematic cross-sectional view of a fourth skid.

The variant MC4 illustrated schematically in FIG. 14 works with the same principle. Here, a body 100 made of ferromagnetic material has a U or C-shaped cross-section, and is configured to house inside it magnets 102 which are arranged, e.g. at the ends of the U or C respectively, parallel to the Y axis to define an empty linear channel 34 crossed by all-equiverse magnetic field lines exiting one wall of the U and entering the other opposite wall.

A or each of the magnets 102 is mounted linearly movable in the body 100 (direction W) to vary its distance inside the channel 34 with respect to the head 28. In this way, the same force F generated in the skid MC1 can be obtained by means of a/the presser 46: the head 28 remains stationary, but a side wall of the channel 34 with the magnet 102 is moved closer to the head 28.

For example, the magnet 102 may be mounted on a sliding block 104 whose relative position relative to the body 100 may be altered by, for example, turning a screw or a threaded dowel 106.

Figure 7:
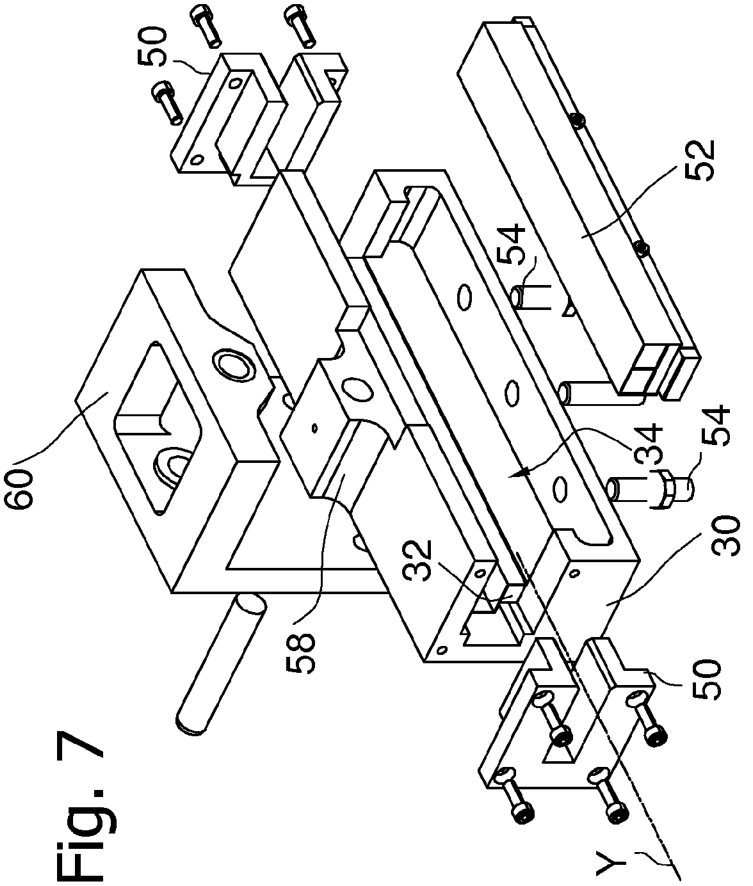
FIG. 7 shows an exploded three-dimensional view of a second skid.

FIG. 7 illustrates a skid MC2, slidable on the straight guide 14 along the Y axis as described for the skid MC1. Although the system preferably comprises two pairs of skids MC2, each on a guide 14, as in FIGS. 1 and 2, for simplicity only one skid is described.

The skid MC2 still comprises a body 30 having a U-shaped cross-section, and magnets 32 are mounted within it to generate in the empty linear channel 34 a magnetic field as described for the skid MC1. The interaction of the magnetic field generated by the MC2 skid with the guide 14 is the same as that of the skid MC1.

Slotted guiding and centering caps 50 are preferably mounted at the ends of the channel 34 to improve coupling with the guide 14.

The skid MC2 comprises another embodiment for the means for generating the load-counteracting force F.

Movably mounted in the body 30 are magnets 52 that can generate a magnetic field having a polar axis transverse to the channel 34 (and orthogonal to the Y axis). For example, the magnetic field of the magnets 52 comprises field lines that cross or invade the channel 34 and strike, orthogonally or nearly so, the lateral surface of the guide portion 24. Thus, the magnets 52, by attracting or repelling the track or guide 14, can attract or repel the skid MC2 on the guide 14 orthogonally to the Y axis.

The amplitude of the force F can be adjusted by changing the relative position of the magnet 52 with respect to the guide 14. In the example, the magnets 52 are translatable in a direction orthogonal to the Y axis.

A way to achieve such a translation is, for example, to mount the magnets 52 fixed to the body 30, inside a housing next to the channel 34, by means of screws 54, whose degree of screwing calibrates linearly said relative position.

Figure 8:
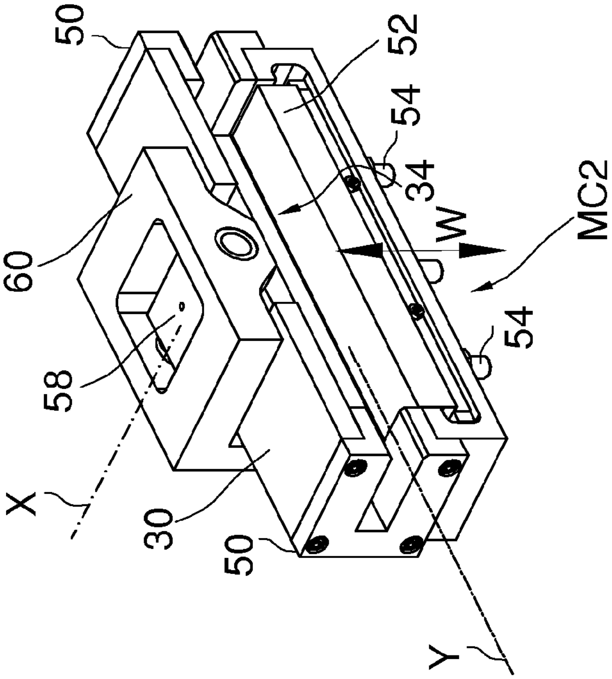
FIG. 8 shows a three-dimensional view of the second skid as assembled.

FIGS. 7 and 8 also show an optional technical solution to better dynamically adapt the skid to the guide.

For this purpose, the body 30 or the skid is coupled to the elevator so that it can swing and tilt with respect to the longitudinal axis of the guide 14.

In the example of FIG. 8, a centerline portion 58 of the body 30 is hinged or pivoted about an axis X to a support 60 integral with the cabin 12. The axis X is parallel to the plane containing the guides 14, and in use is horizontal.

In this way, the body 30 can autonomously oscillate about the X-axis to track small deformations in the guide 14.

Figure 10:
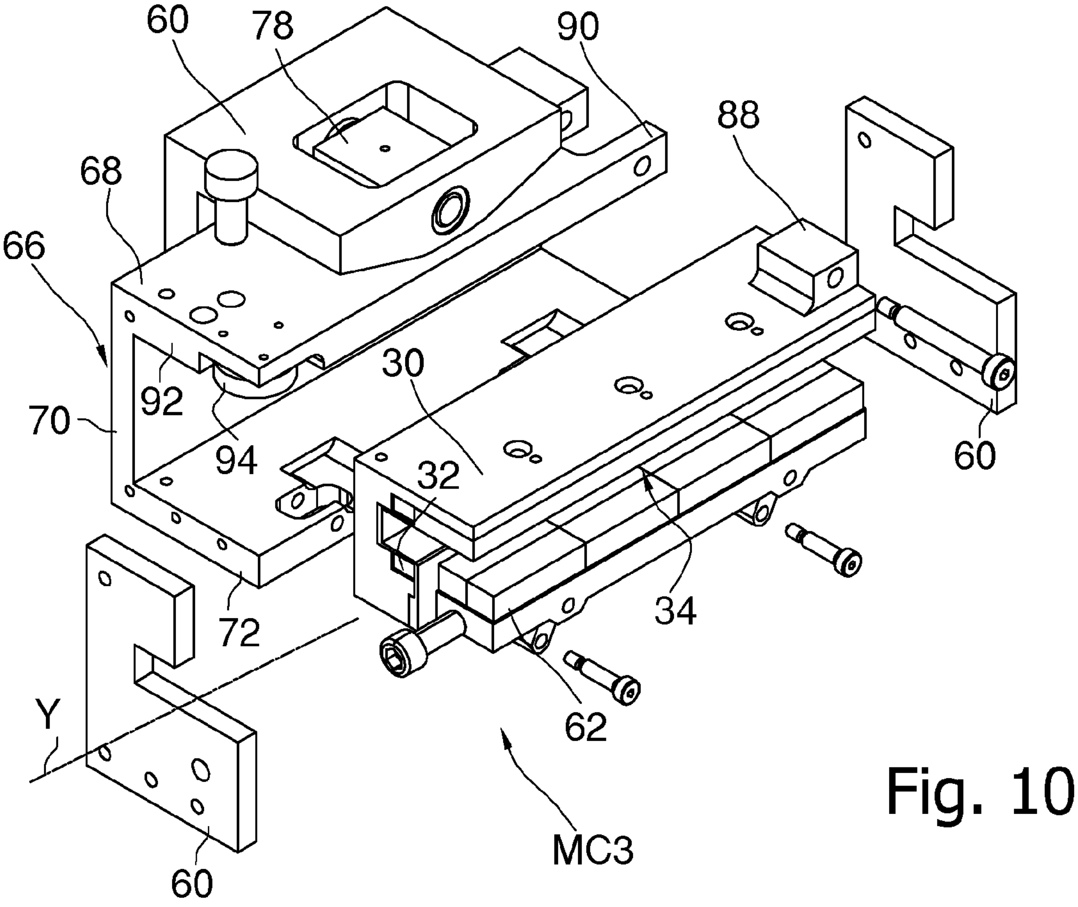
FIG. 10 shows an exploded three-dimensional view of a third skid.
Figure 11:
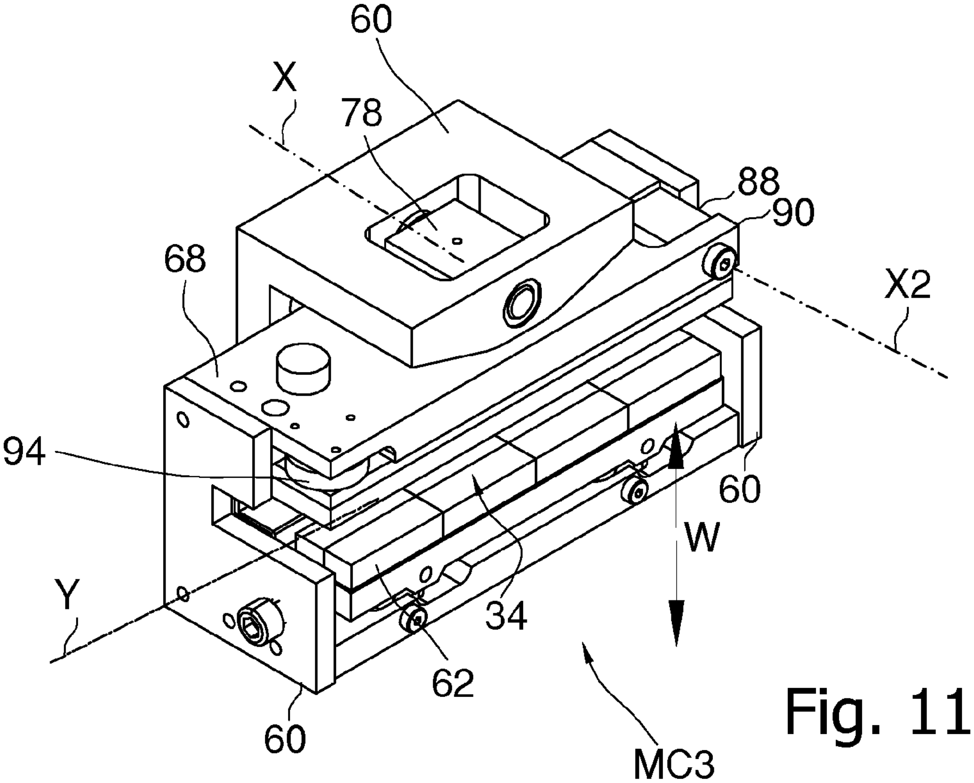
FIG. 11 shows a three-dimensional view of the third skid as assembled.
Figure 13:
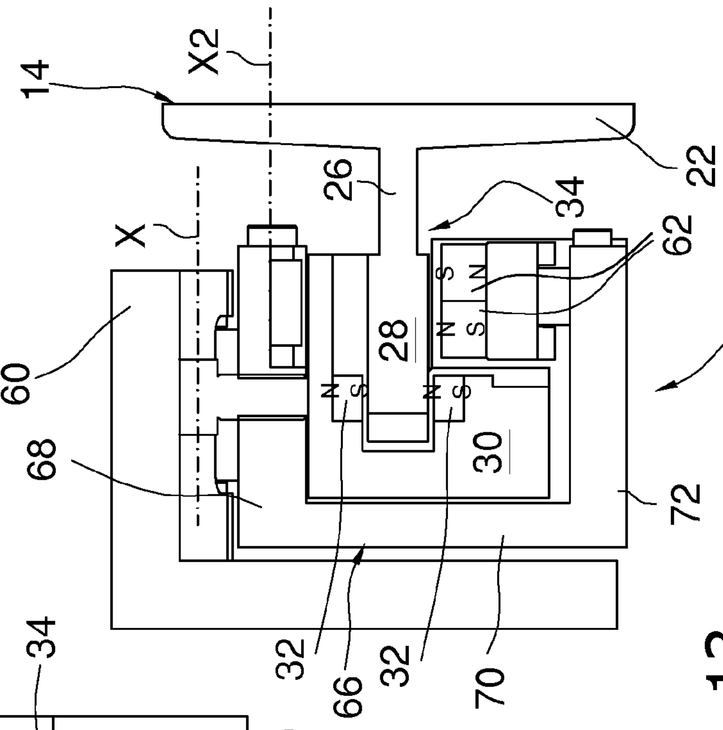
FIG. 13 shows a cross-sectional view of the third skid according to the plane XIII-XIII.

FIG. 10 illustrates a skid MC3, slidable on the straight guide 14 along the Y axis as described for the skid MC1 and MC2. Although the system preferably comprises two pairs of skids MC3, each on a guide 14, as in FIGS. 1 and 2, again for simplicity only one skid is described here.

The skid MC3 still comprises a body 30 having a U-shaped cross-section, and magnets 32 are mounted within it to generate in the empty linear channel 34 a magnetic field as mentioned for the skid MC1 and MC2. The interaction of the magnetic field generated by the skid MC3 with the guide 14 is the same as for the skid MC1 and MC2.

Slotted guiding and centering brackets 61 are preferably mounted at the ends of the channel 34 to improve coupling with the guide 14.

The skid MC3 comprises another embodiment for the means for generating the load-counteracting force F.

In the body 30 there is movably mounted a block 62, comprising magnets, that can generate a magnetic field with a polar axis transverse to the channel 34 (and orthogonal to the Y axis), as mentioned for the magnet 52 of the skid MC2.

The amplitude of the force F can be adjusted by changing the relative position of the block 62 relative to the guide 14.

The skid MC3 implements a different system for the positional adjustment of the magnetic block 62.

Figure 9:
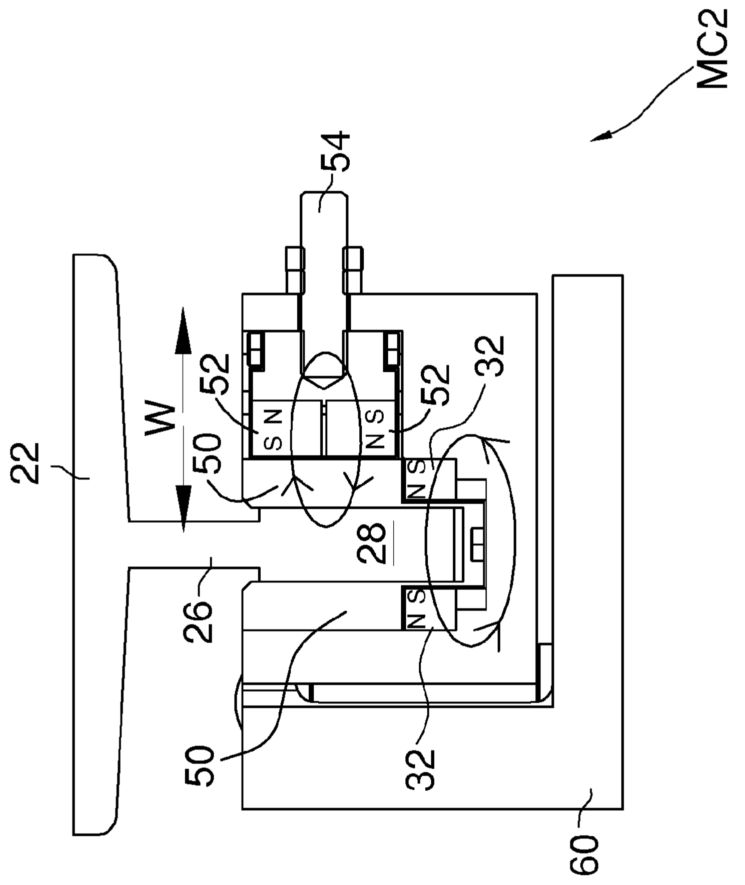
FIG. 9 shows a cross-section of the second skid according to a plane orthogonal to the sliding axis.
Figure 12:
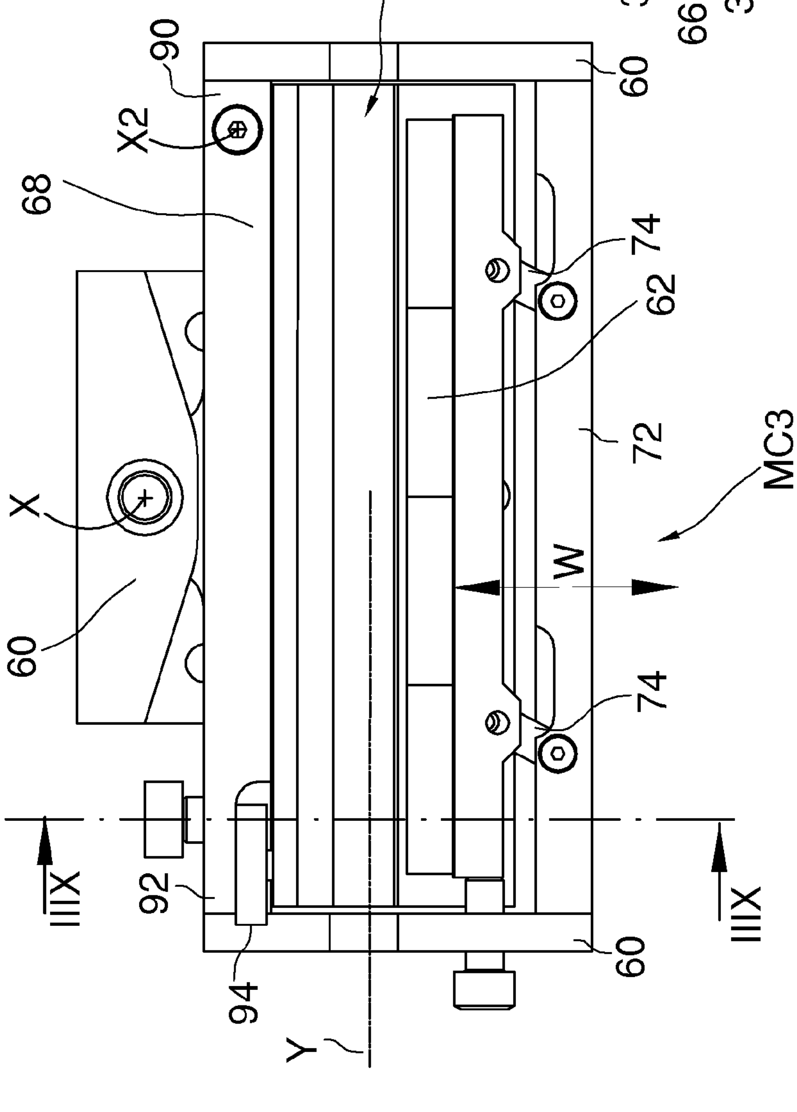
FIG. 12 shows a lateral view of the third skid.

The body 30 is housed in a rigid housing 66 having a U-shaped cross-section, i.e. formed by three walls denoted 68, 70, 72 mutually arranged two-by-two at 90 degrees. The magnet 62 is hinged at two different points on the inner surface of the wall 72 by means of two equal rigid arms 74 (see FIG. 12), so that the whole of the inner surface of the wall 72, the two rigid arms 74 and the magnetic block 62 form an articulated parallelogram. Thanks to this structure, the block 62 can translate with respect to the housing 66 and the body 30 to move closer to, or move away from, the channel 34 (direction W) while remaining parallel to the Y axis. The position of the magnetic block 62 is stably fixable, e.g. by a screw that is screwed into the housing 60 and engages the base of the block 62 (in a construction similar to FIG. 9).

The skid MC3 comprises too the optional technical solution—described for the skid MC2—that allows the skid to be dynamically adapted to the guide 14, i.e. the body 30 or the skid is coupled to the elevator so that it can swing and tilt with respect to the longitudinal axis of the guide 14.

In the example, a centerline portion 78 of the housing 66 is hinged or pivoted about an axis X to a support 60 integral with the cabin 12. The X-axis is parallel to the plane containing the guides 14, and in use is horizontal.

In this way, the body 30 can autonomously oscillate about the X-axis to track small deformations in the guide 14.

The number and/or arrangement of the magnets 52, 62 may also vary from what is illustrated.

The skid MC3 comprises another optional technical solution, which is useful for detecting, and preferably also dynamically controlling, the force F generated by the means for generating the force F.

For this purpose, the body 30 is movably coupled to the housing 66. In the example, an end portion 88 of the body 30 is hinged or pivoted about an axis X2—parallel to the axis X—to an end portion 90 of the housing 66. In a second end portion 92 of the housing 66, opposite the end portion 90, is mounted a sensor 94 capable of sensing the force imparted by the housing 66 on the body 30 and/or the force with which the body 30 pushes against the housing 66. The sensor 94 is, for example, a load cell.

By reading the signal emitted by the sensor 94 it is possible to calculate/determine the amplitude of the moment M on the cabin 12, i.e. the external load on the skid MC3, a data that is very useful for the control and diagnostics of the system.

Note that the presence of the housing 66 allows the X and X2 axes to be put into practice simultaneously.

In a more preferred variant, an electronic control unit (not shown), located on board the skid MC3 or the elevator or remotely, is programmed to read the signal emitted by the sensor 94 and calculate/determine the amplitude of the moment M on cabin 12, a data that is most useful for system diagnostics.

In a preferred variant, the skid comprises a drive or an actuator (not shown) to move the means for generating the load-counteracting force. For example, the skid MC3 may comprise a drive or actuator (not shown) to move the magnetic block 62.

In an even more preferred variant, the use of the sensor 94 and the regulation of the load-counteracting force F is combined, e.g. by means of the actuator or the driving of an electromagnet, so that the skid can dynamically adjust the force F (produced by the means for generating the force F) in order to automatically compensate the moment M as the load changes. In particular, the electronic control unit is programmed to implement a feedback control with the steps of reading the signal of sensor 94, and driving the means for generating the force F, or driving the actuator that influences the force F generated by the means for generating the force F, in order to generate a certain force F that zeroes or brings to a reference value the signal emitted by the sensor 94.

Figure 15:
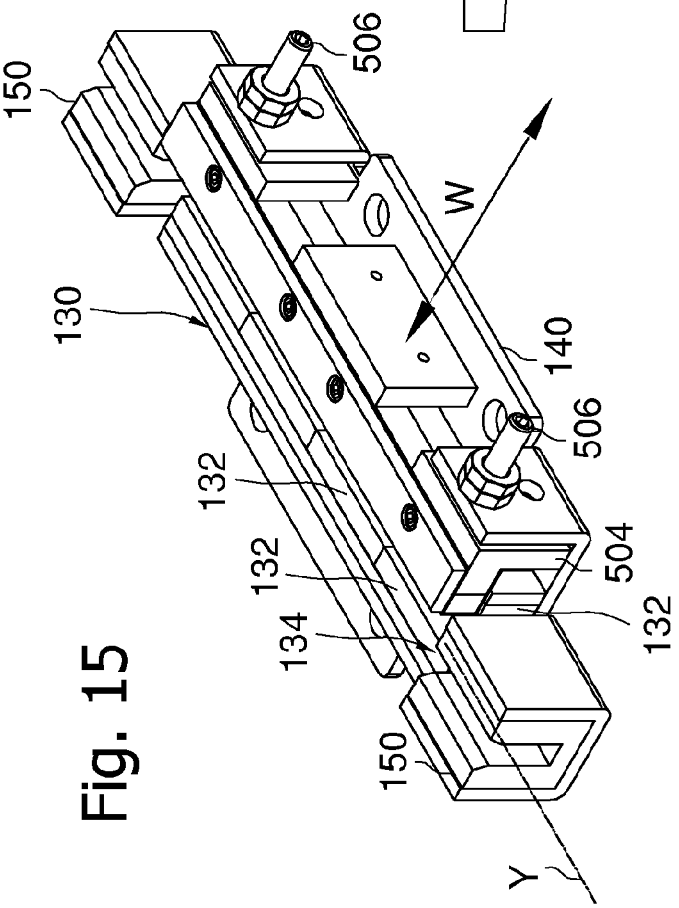
FIG. 15 shows a three-dimensional view of a fifth skid.
Figure 16:
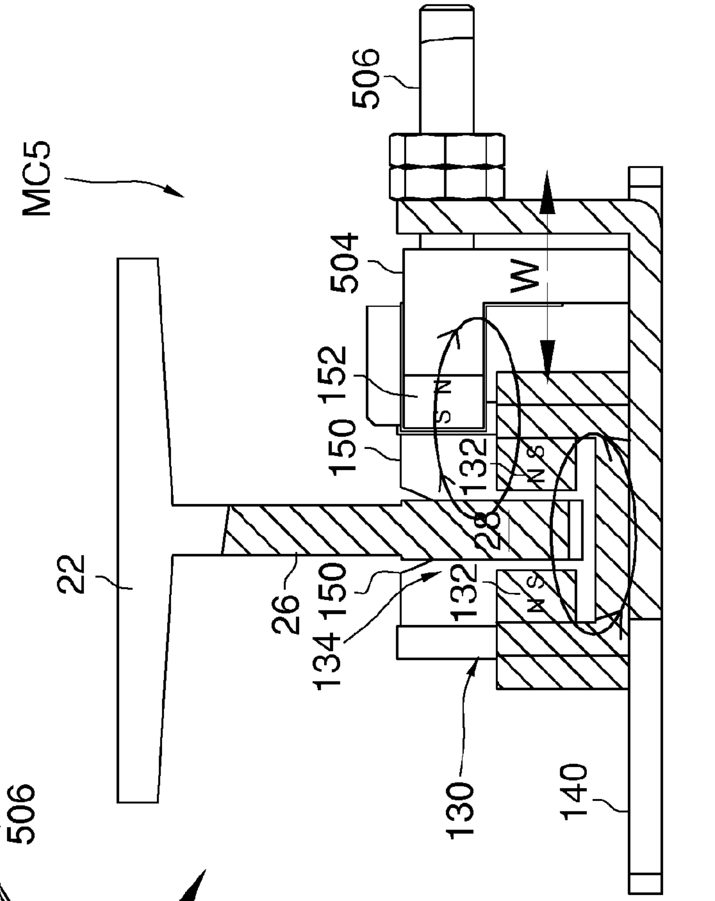
FIG. 16 shows a cross-sectional view of the fifth skid as coupled to a guide.

FIGS. 15 and 16 show an additional variant of skid MC5 for a guide 14.

The skid MC5 comprises a body 130 mounted on a plate 140.

The body 130 has a U-shaped cross-section, and within it are mounted magnets 132 (only some shown) arranged—respectively—at the ends of the U and parallel to the Y-axis. The body 130 thus defines an empty linear channel 134 as the channel 34. The interaction of the magnetic field generated by the skid MC5 with the guide 14 is the same as that of the skid MC1.

Guiding and centering splined bodies 150 are preferably mounted at the ends of the channel 134 to improve the coupling with the guide 14.

The skid MC5 comprises another embodiment for the means for generating the load-counteracting force F.

A magnet 152 capable of generating a magnetic field having a polar axis transverse to the channel 134 (and orthogonal to the Y axis) is movably mounted in the body 130. For example, the magnetic field of the magnet 152 comprises field lines that cross or invade the channel 134 and strike, orthogonally or nearly so, the lateral surface of the guide portion 24. Thus, the magnet 152, by attracting or repelling the rail or guide 14, is able to attract or repel the skid MC5 on the guide 14 orthogonally to the Y axis.

The amplitude of the force F can be adjusted by changing the relative position of the magnet 152 relative to the guide 14.

In the example, the magnet 152 is translatable in a direction orthogonal to the Y axis. A way to achieve this translation is, for example, to mount the magnet 152 on a sliding block 504 whose relative position with respect to the body 130 can be changed, for example, by turning a screw or a threaded dowel 506.

The invention claimed is:

1. A translation and/or transportation system comprising:

a movable structure for transportation, a guide, a skid integral with the movable structure and slidingly coupled to the guide along a sliding axis, wherein the skid is configured to stably and slidingly couple the movable structure to the guide, and comprises a centering member in contact with the guide, and means—or a device—for generating without contact with the guide a force counteracting an external load impressed on the centering member, the load-countering force being repulsive or attractive on the guide, and directed in the opposite direction to the force impressed by the external load on the centering member, the skid comprising an auxiliary magnetic field generator for attracting or repelling the guide with a load-counteracting force directed along a direction orthogonal to a plane passing through the longitudinal axis of the guide, or in a direction orthogonal to the plane containing the guides if there are two guides, the auxiliary magnetic field generator being movably mounted in the skid to be able to move relative to the guide coupled to the skid so that the amplitude of the load-counteracting force can be adjusted.

2. The system according to claim 1, wherein the auxiliary magnetic field generator is movably mounted in the skid to be able to move orthogonally to the sliding axis of the skid, so that the amplitude of the load-counteracting force can be adjusted.

3. The system according to claim 1, wherein the skid comprises:

a U-shaped body or a C-shaped body made of a ferromagnetic material having a linear cavity extending parallel to the sliding axis and being mountable astride the guide, a magnetic flux generator for generating a magnetic flux that closes within the body, the body being configured to define a magnetic circuit to convey the magnetic flux generated by the magnetic flux generator so that the flux crosses the cavity and strike sides of the guide exiting from and entering, respectively, opposite walls of the cavity thereby generating a coupling force between the skid and the guide to keep the guide at a stable insertion level inside the linear cavity, the load-counteracting force being essentially orthogonal to the coupling force.

4. The system according to claim 3, wherein the auxiliary magnetic field generator is movably mounted in the skid to be able to move in a direction orthogonal to parallel walls of the U-shaped body or the C-shaped body, so that the amplitude of the load-counteracting force can be adjusted.

5. The system according to claim 3, wherein the auxiliary magnetic field generator is movably mounted on or in the body made of a ferromagnetic material.

6. The system according to claim 3, wherein the load-counteracting force is directed along a direction orthogonal to parallel walls of the U-shaped body or the C-shaped body.

7. The system according to claim 3, wherein the skid comprises means or a device for displacing, relative to the guide, the flux generator, so that the displacement unbalances the magnetic forces in the cavity exerted on the side of a portion of the guide that is reactive to the magnetic field.

8. The system according to claim 3, wherein the skid comprises means of a device for displacing, relative to the guide, a portion of the magnetic circuit containing the flux generator, so that the displacement unbalances the magnetic forces in the cavity exerted on the side of a portion of the guide that is reactive to the magnetic field.

9. The system according to claim 3, wherein the guide comprises a magnetic field reactive portion made of a ferromagnetic material that protrudes cantilevered from a base, the reactive portion being slidably mounted in the linear cavity for sliding relatively to the cavity parallel to the sliding axis as the skid moves relative to the guide.

10. The system according to claim 9, wherein said reactive portion has a cross-section which, viewed in a plane orthogonal to the sliding axis, has a mushroom shape with a larger dimension or width in the part struck by a magnetic field exiting or entering the opposite walls of the cavity, and a smaller dimension or width in the part closest to the base, so that the coupling force generated by the magnetic field on the reactive portion is such that the force increases when the reactive portion tends to move away, orthogonally to the longitudinal axis, from a stable point inside the cavity to exit therefrom or enter thereinto more.

11. The system according to claim 3, wherein the skid comprises a support plate, and the body made of a ferromagnetic material is mounted oscillating with respect to a support plate about an axis passing through the centerline of the body made of a ferromagnetic material, said axis passing through the centerline being contained in a plane orthogonal to the sliding axis of the skid;

so that the body made of a ferromagnetic material can oscillate about the axis passing through the centerline.

12. The system according to claim 11, wherein the body made of a ferromagnetic material is hinged, about said axis passing through the centerline, to a housing member containing the body made of a ferromagnetic material, the body made of a ferromagnetic material being mounted hinged on the housing member.

13. The system according to claim 1, wherein the skid comprises an adjustment member for setting a relative distance between the guide coupled to the skid and the auxiliary magnetic field generator.

14. The system according to claim 13, wherein the adjustment member is coupled between the skid and the means for generating the load-counteracting force, the adjustment member being adapted to push or pull the means for generating the load-counteracting force.

15. The system according to claim 14, wherein the adjustment member is a screw, screwed into the skid and the means for generating the load-counteracting force by means of a corresponding thread.

16. The system according to claim 13, wherein the adjustment member is an articulated parallelogram structure formed by a side that consists of the means for generating the load-counteracting force, an opposite side that consists of a fixed portion of the skid, and two rigid arms connecting said sides so as to be able to translate the means for generating the load-counteracting force relatively to the guide.

17. The system according to claim 1, wherein the skid comprises a sensor for measuring the external load on the skid, a load constituted of a force impressed by the guide on the skid orthogonally to the sliding axis, and comprising an electronic circuit configured to detect a signal from the sensor, and drive the means or device for generating the load-counteracting force to adjust the amplitude of the load-counteracting force so as to bring or maintain the value emitted by said sensor to a reference value, e.g. zero or substantially zero.

18. The system according to claim 17, wherein the skid comprises a drive or actuator to move the means for generating the load-counteracting force, and the electronic circuit is connected to the actuator to drive the actuator, thereby changing the amplitude of the load-counteracting force, by means of an electrical signal.

19. The system according to claim 1, wherein the movable structure is a passenger cabin.

20. The system according to claim 1, wherein the movable structure is a load-carrying platform for goods.

* * * * *